United States Patent [19]

Craig et al.

[11] 4,365,692

[45] Dec. 28, 1982

[54] ELEVATING CATWALK

[75] Inventors: Gary W. Craig; Jack W. Langston, both of Tulsa, Okla.

[73] Assignee: Loffland Brothers Company, Tulsa, Okla.

[21] Appl. No.: 212,891

[22] Filed: Dec. 4, 1980

[51] Int. Cl.³ ........ B60S 13/00

[52] U.S. Cl. ........ 187/8.72; 182/141

[58] Field of Search ........ 187/8.71, 8.72, 8.57, 187/18, 5.47; 182/157, 152, 69, 141, 156; 254/122, 10 R, 10 B, 10 C

[56] References Cited

U.S. PATENT DOCUMENTS

| | | | |
|---|---|---|---|
| 804,771 | 11/1905 | Sawyer | 187/8.72 |
| 2,790,683 | 4/1957 | Clark | 187/8.72 |
| 2,806,747 | 9/1957 | Jaeger | 182/152 |
| 2,922,533 | 11/1960 | Barge, Jr. | 187/8.72 |
| 3,282,566 | 11/1966 | Clarke | 187/8.71 |
| 3,317,004 | 5/1967 | Harrison, Jr. | 187/8.72 |
| 3,348,572 | 10/1967 | Aall | 187/8.72 |
| 3,442,351 | 5/1969 | Parrish et al. | 182/141 |

*Primary Examiner*—Stanley H. Tollberg
*Assistant Examiner*—Kenneth Noland
*Attorney, Agent, or Firm*—Head, Johnson & Stevenson

[57] ABSTRACT

An elevating catwalk apparatus for use at a well bore drilling site, or the like, for effectively elevating the "ground level" with respect to the drilling floor of the well drilling apparatus and comprising a base framework structure having a catwalk secured thereto by a plurality of spaced support posts and movable between elevated and lowered positions with respect thereto, the opposite ends of the support posts being pivotally secured between the catwalk and the base framework, angularly disposed brace members having one end pivotally secured to at least one of the support posts and the opposite end pivotally and slidably secured to the base structure for strengthening the support of the catwalk in the elevated position thereof, the catwalk being responsive to longitudinal pressure in one direction for moving upwardly with respect to the base framework and pressure in an opposite direction for moving downwardly with respect to the base framework.

6 Claims, 8 Drawing Figures

ELEVATING CATWALK

BACKGROUND OF THE INVENTION

1. Field of the Invention

This invention relates to improvements in catwalk apparatus for use at a well bore drilling site, or the like, and more particularly, but not by way of limitation, to an elevating catwalk apparatus.

2. Description of the Prior Art

In the earlier days of well bore drilling operation, much of the work operations necessary for the erection of the mast was accomplished substantially at ground level by the drilling and/or operating personnel, and access to the usual travelling block, and other equipment utilized in combination with the mast was relatively easy. As more and more safety equipment has been required at the surface of a well bore drilling site, such as blow out preventers, and the like, the level of the drill "floor" has been elevated with respect to the surface of the ground to such a great extent that today access to substantially all of the necessary equipment for elevating the mast is quite difficult.

This is a great disadvantage since the equipment is usually very heavy and many dangerous situations develop because of the elevated position of the drilling floor. For example, the travelling block is quite heavy, and it is the common practice today to suspend the block by means of substantially horizontally disposed suspended cables during the erection of the mast. This can be very dangerous since if the block is "lost" it can endanger the life of the personnel at the drilling site.

SUMMARY OF THE INVENTION

The present invention contemplates a novel elevating catwalk which has been particularly designed and constructed for overcoming the foregoing disadvantages. The novel device, in effect, elevates the "ground level" into substantially the same relative position with respect to the drilling floor as in the previous days when the drilling floor was essentially at ground level. In order to accomplish this, the novel catwalk structure was developed which may be stored in the "down" position, with drill pipe sections, and the like, stored therein, if desired, and which may be elevated to an "up" position to provide a walkway at a level consistent with the upper level of the drilling floor.

The catwalk structure is secured to a base framework by means of a plurality of spaced support beams having the opposite ends thereof pivotally secured between the catwalk and base means. The catwalk structure is responsive to a longitudinal pull or pressure in one direction for pivoting of the support posts about the pivot connects with the base means for elevating the catwalk with respect to the base means, and to a longitudinal pull in a reverse direction for pivoting the support posts in an opposite direction for lowering of the catwalk structure. Suitable brace members are secured between at least one of the support posts and the base means for strengthening the catwalk structure in the elevated position, and the brace members have one end pivotally secured to the catwalk structure and the opposite end pivotally and slidably secured to the base means. When the catwalk is moved toward the elevated position therefor, the slidable end of the brace member slides along the base framework as the opposite end of the brace members moves upwardly with the support posts, and when the catwalk reaches the desired elevated position therefor, the brace members may be pinned in position for securely retaining the support posts or beams in the upright position thereof for facilitating supporting of the elevated catwalk. Of course, the procedure is reversed as the catwalk structure is lowered with respect to the base means. The novel elevating catwalk apparatus is simple and efficient in operation and economical and durable in construction.

DETAILED DESCRIPTION OF THE PREFERRED EMBODIMENT

Figures 5, 6:
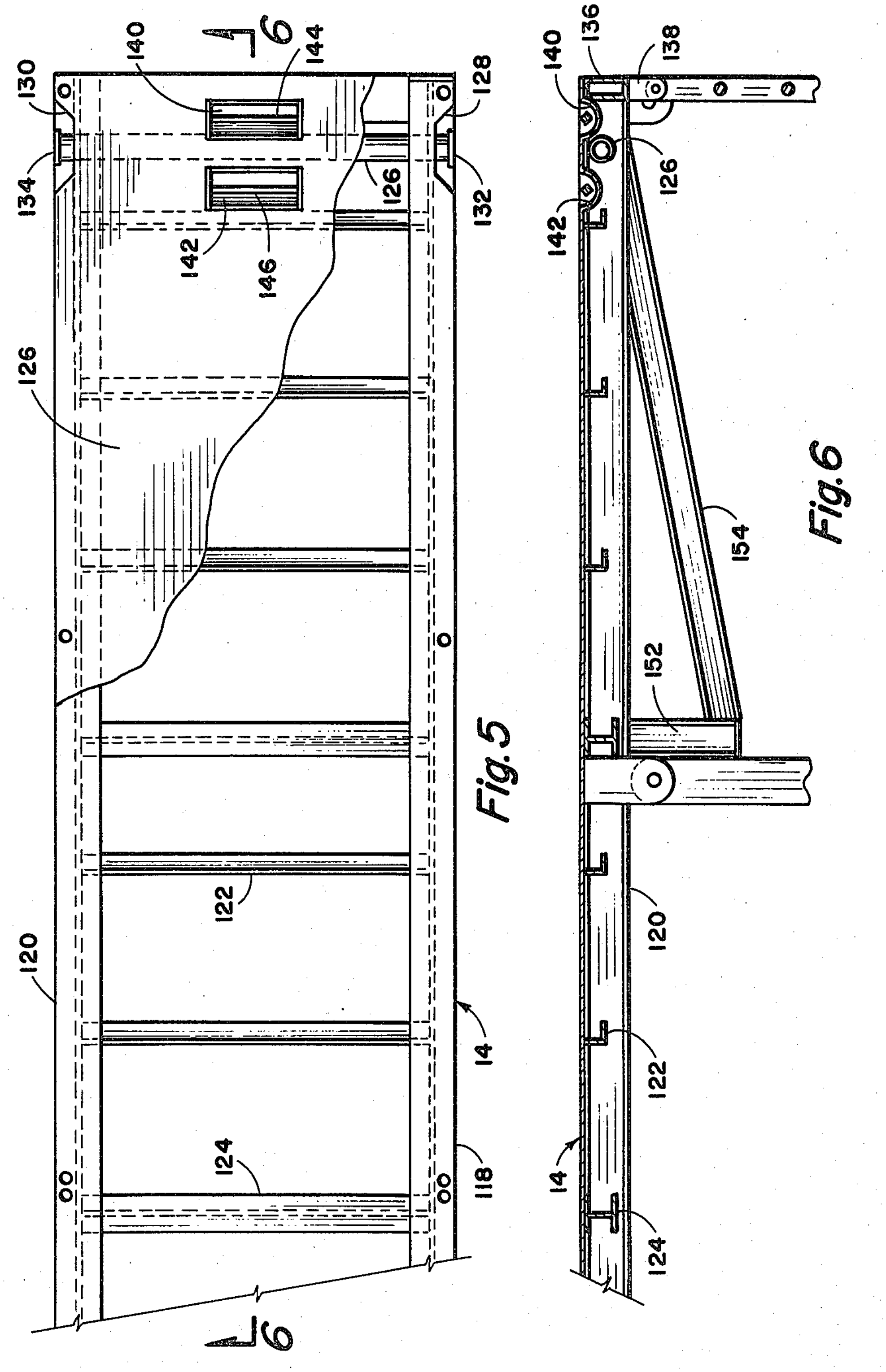
FIG. 5 is a broken plan view of the top deck portion of a catwalk apparatus embodying the invention.
FIG. 6 is a sectional view taken on line 6—6 of FIG. 5.
Figure 7:
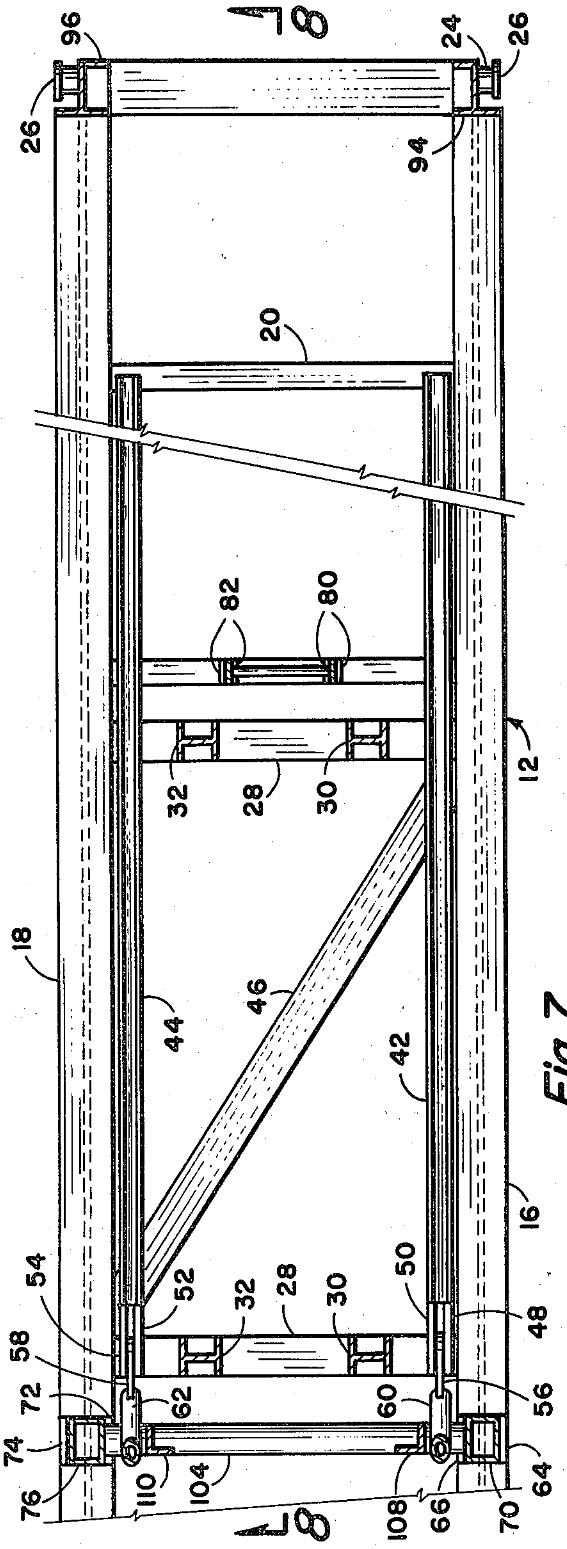
FIG. 7 is a broken plan view of the base means of a catwalk apparatus embodying the invention, and is taken on line 7—7 of FIG. 8.
Figure 8:
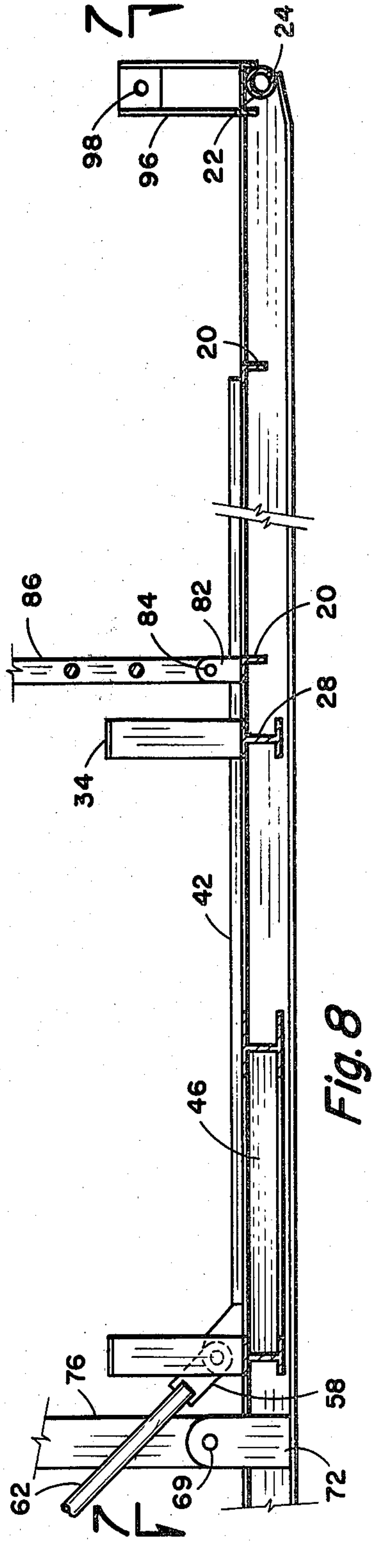
FIG. 8 is a view taken on line 8—8 of FIG. 7.

Referring to the drawings in detail, reference character 10 generally indicates an elevating catwalk apparatus comprising a base structure 12 having a catwalk assembly 14 movably secured thereto and movable between elevated and lowered positions with respect thereto. The base structure 12 may be of any suitable framework construction, but as shown herein preferably includes a pair of mutually parallel H-beams 16 and 18, or the like, adapted to be positioned on the surface of the ground (not shown), or the like, and function as skids for the apparatus 10. The beams 16 and 18 may be spaced apart by a plurality of longitudinally spaced cross member 20 which are welded or otherwise secured therebetween. It is also preferable to weld or suitably secure similar cross members 22 between the spaced and opposite ends of the H-beams 16 and 18, only one of the cross members 22 being shown in FIG. 8. A pipe or tube member 24 is also preferably secured in substantial longitudinal alignment with each cross member 22, and preferably extends beyond both ends of the respective cross member as particularly shown in FIGS. 5 and 7. The outer ends of each pipe may be provided with an enlarged head member 26, and the protruding ends of the pipes 24 facilitating the movement of the skids or H-beams 16 and 18 across the surface of the ground during movement of the apparatus 10 from site to site in a skidding action, as is well known.

A plurality of longitudinally spaced I-beams 28, or the like, are welded or otherwise secured between the beams 16 and 18, each beam 28 being provided for supporting a pair of upstanding spaced stationary support posts 30 and 32 thereon. It may be desirable to provide a plate member 34 (FIG. 8) at the upper end of each support post 30 and 32 for facilitating supporting of the apparatus 14. In addition, it is desirable to provide a substantially horizontally disposed brace member 38 between the forward or left hand pairs of longitudinally aligned posts 30 and 32, as viewed in the drawings, with each of the horizontal brace members 38 being provided with an angularly disposed surface 40 at the inner end thereof for a purpose as will be hereinafter set forth.

A first rail or track member 42 is suitably secured along the inboard side of the beam 16, and a second generally similar rail or track member 44 is similarly secured to the inboard side of the beam 18, preferably in substantially parallel relationship with the first rail 42. The outer end of each rail 42 and 44 may be welded or otherwise secured to one of the cross member 20, if desired, and an angularly disposed strap member 46 is preferably secured between the rails 42 and 44 for strengthening thereof, as is well known. A first pair of mutually parallel flanges 48 and 50 are secured to the forward end of the rail 42, and a similar pair of parallel flanges 52 and 54 are similarly secured to the forward end of the rail 44. Each flange 48, 50, 52, and 54 is provided with a bore 56 (shown in broken lines in FIG. 8), each bore 56 being in substantially axial alignment with the other bores 56 for a purpose as will be hereinafter set forth. A first plate member 56 is interposed between the flanges 48 and 50 and is slidable throughout the length of the rail 42 in a manner and for a purpose as will be hereinafter set forth, and a second similar plate 58 is interposed between the flanges 52 and 54 and is slidable throughout the entire length of the rail 44, a rod member 60. Each plate member 56 and 58 is provided with a bore (not shown) which may be selectively aligned between the bores 56 of the respective flanges as will be hereinafter set forth. A first rod means 50 is suitably secured to the outer end of the plate 56 and extends outwardly therefrom, and a similar second rod means 62 is secured to the outer end of the plate member 58 and extends outwardly therefrom.

A plurality of longitudinally spaced pairs of aligned upstanding flanges 64 and 66 are welded or otherwise secured to the outboard sides of the beam 16 and are provided with aligned bores 68 therein for receiving the opposite ends of a suitable pivot pin therethrough in order to pivotally secure one end of an elongated support post 70 between each pair of flanges 64 and 66. A plurality of similar spaced pairs of aligned upstanding flanges 72 and 74 are welded or suitably secured to the outboard sides of the beam 18 and are each provided with aligned bores 69 for receiving suitable pivot pin means therethrough in order to pivotally secure one end of an elongated support post 76 between each pair of flanges 72 and 74.

Whereas substantially any desired number of the posts 70 and 76 may be longitudinally spaced along the beams 16 and 18, respectively, it is preferable to provide two of the posts 70 and two of the posts 76. In addition, the forward or inner end of the rail 42 preferably terminates outboard of the right hand post 70 as viewed in FIG. 1, and the outer end of the rod 60 is pivotally secured to the outer post 70 in spaced relation with respect to the pivot connection 68 as shown at 78 in FIG. 1. Similarly, the inner end of the rail 44 terminates outboard of the right hand post 76 (shown only in FIGS. 7 and 8), and the outer end of the rod 62 is pivotally secured to the other post 76 in spaced relation with respect to the pivot connection 69.

Figure 4:
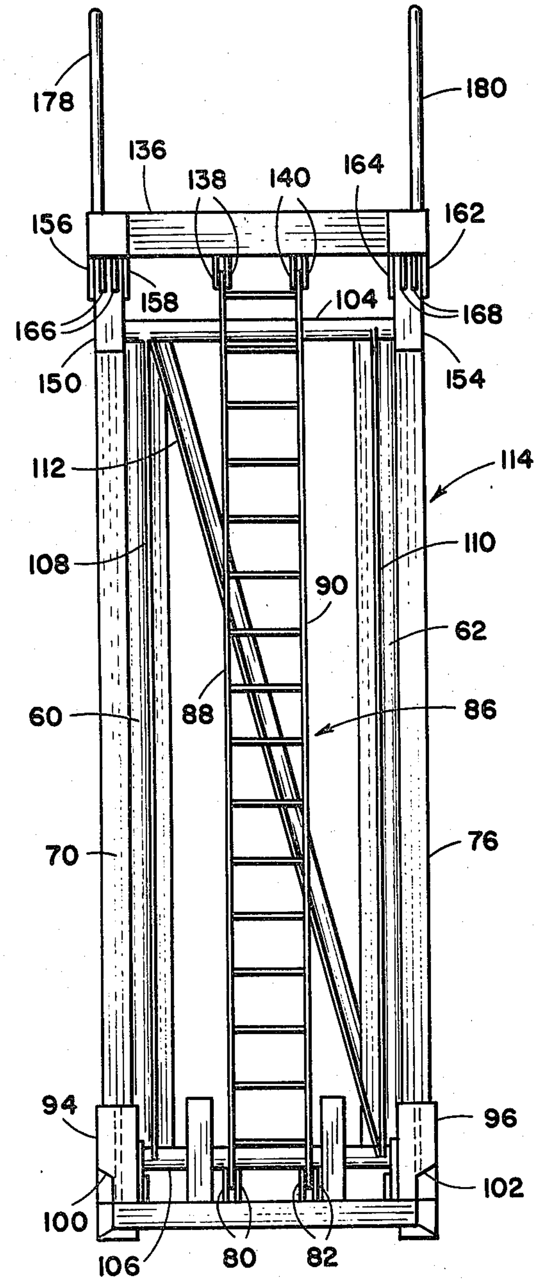
FIG. 4 is a view taken on line 4—4 of FIG. 1.

A pair of upstanding spaced flanges 80 and 82 are welded or the like to one of the cross member 29 and are provided with aligned bores 84 for receiving suitable pivot pin means therethrough for pivotally supporting one end of a ladder assembly 86 between the flanges 80 and 82. The ladder assembly 86 is preferably substantially centrally disposed between the beams 16 and 18, as clearly seen in FIG. 4, and may comprise a pair of elongated side members 88 and 90 having a plurality of longitudinally spaced treads or steps 92 secured therebetween. As hereinbefore set forth, one end of the side member 88 is pivotally secured between the flanges 80 and one end of the side member 90 is pivotally secured between the flanges 82.

The right hand end of the base means 12 as viewed in the drawings is preferably provided with a pair of spaced upstanding oppositely disposed channel members 94 and 96, or the like, each having a bore 98 provided in the upper portion thereof for a purpose as will be hereinafter set forth. In addition, each channel member 94 and 96 is preferably provided with a recess or cut-away portion 100 and 102, respectively, (FIG. 4) providing access to the ends of the pipe 24.

Figure 1:
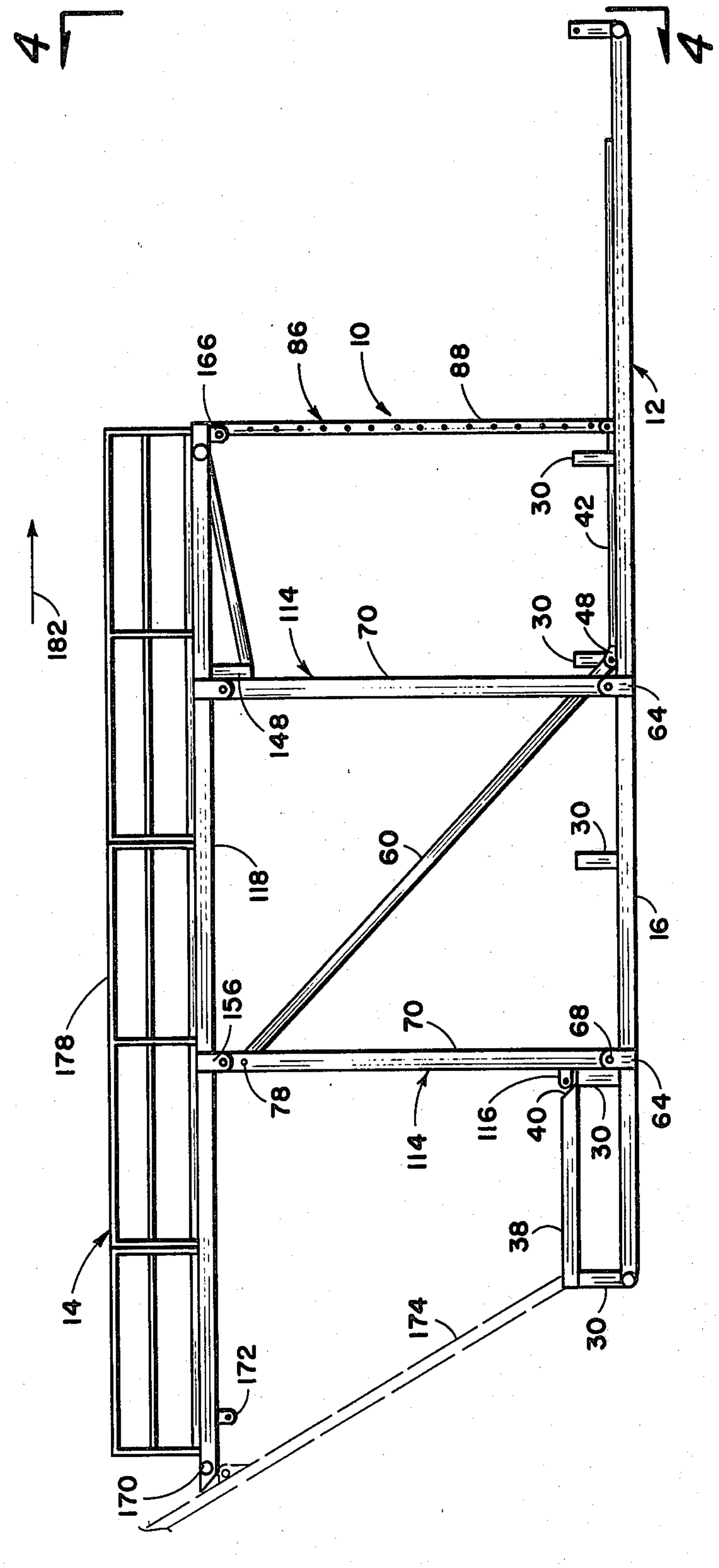
FIG. 1 is a side elevational view of an elevating catwalk apparatus embodying the invention and illustrating the catwalk section in an elevated position.

Each of the posts 70 is disposed in substantial alignment with an associated post 76 and is operably connected therewith by means of cross bars 104 and 106 secured between the associated opposite ends of the posts. A pair of spaced angle members 108 and 110 are secured between the cross bars 104 and 106 and interposed between the posts 70 and 76. An angularly disposed brace member 112 is suitably secured between one end of the post 76 and a diagonally opposed end of the post 70 for rigidity, and thus providing a lifting link assembly 114 at each of the posts 70 and 76. Whereas each of the link assemblies 114 is substantially identical, the forwardly disposed, or left hand assembly 114, as viewed in FIG. 1 is provided with a pair of outwardly extending apertured flanges 116 (only one of which is shown in FIG. 1) transversely spaced between the beams 16 and 18 for a purpose as will be hereinafter set forth.

The catwalk assembly or structure 14 may be of any suitable construction, but as shown herein preferably comprises a pair of mutually parallel H-beams 118 and 120, or the like, spaced apart by a plurality of longitudinally spaced cross bars 122 welded or otherwise secured therebetween. In addition, a plurality of H-beams 124, or the like, are secured between the beams 118 and 120 and longitudinally spaced therealong for a purpose as will be hereinafter set forth. A suitable floor plate means 126 is secured to the outer side of the beams 118 and 120 as particularly shown in FIG. 5 to provide a walk way for the drilling personnel and the like during use of the apparatus 10.

A pipe or rod 126 is secured between the beams 118 and 120 in the proximity of the right hand ends thereof, as viewed in the drawings, and the beams 118 and 120, as well as the floor plate 125, are provided with recesses or are cutaway in the proximity of the opposite ends of the pipe 126, as shown at 128 and 130, to provide access to the pipe 126. Each end of the pipe 126 is preferable provided with a cap or head member 132 and 134 for a purpose as will be hereinafter set forth. In addition, a cross member 136 is secured between the beams 118 and 120 outboard of the pipe 126, and a pair of spaced apertured flanges 138 and 140 (FIG. 4) are secured to the lower side of the cross member 136 and interposed between the beams 118 and 120 in substantial alignment with the pairs of flanges 80 and 82. The outer end of the side member 88 is pivotally secured between the flanges 138 and the outer end of the side member 90 is similarly pivotally secured between the flanges 140, thus securing the ladder means 86 between the base means 12 and catwalk assembly 14. The floor plate 126 is recessed in the proximity of the pipe 126, as particularly shown at 140 and 142 in FIGS. 5 and 6, and rods 144 and 146, respectively, are secured therein and extend longitudinally to provide hand grips for working personnel, or the like, during use of the ladder means 86.

A first stop post 148 is welded or otherwise secured to the lower or under side of the beam 118 and is braced by a suitable angularly extending brace member 150 which is secured between the outer end of the stop post 148 and the beam 118. A second similar stop post 152 is secured to the underside of the beam 120 and is similarly braced by a brace member 154. The stop posts 148 and 152 engage the base means 12 in the lowered position of the catwalk structure 14 as will be hereinafter set forth. A plurality of plates or flanges 156 are secured to the ouboard side of the beam 118 and longitudinally spaced therealong, and are each in substantial alignment with a companion flange 158 secured to the inboard side of the beam 118. The flanges 156 and 158 are provided with aligned bores 160 for receiving suitable pivot pin means therethrough for pivotally securing the outer end of one of the posts 70 therebetween. A similar plurality of pairs of flanges 162 and 164 are secured to the outboard and inboard sides, respectively, of the beam 120 and are each apertured for receiving suitable pivot pins therethrough for pivotally securing the outer ends of the post 76 therebetween. In this manner, one end of each post 70 and 76 is pivotally secured to the base means 12 and the opposite end of each post 70 and 76 is pivotally secured to the catwalk section 14. It is also preferable to provide a first pair of spaced downwardly extending apertured flanges 166 on the under side of the beam 118, and a similar pair of spaced downwardly extending apertured flanges 168 on the underside of the beam 120 for facilitating operation of the apparatus 10 as will be hereinafter set forth.

The forward or left hand ends of the beam 118 and 120 as viewed in the drawings may be secured together by a transversely extending pipe 170, and the outer end of each beam 118 and 120 is beveled or canted in a direction complementary to the angular configuration of the shoulder or end 40 of the horizontal element 38, for a purpose as will be hereinafter set forth. In addition, suitable apertured flanges 172 are preferably secured to the underside of the beams 118 and 120 in spaced relation corresponding to the spacing of the flanges 116 for a purpose as will be hereinafter set forth.

Figure 2:
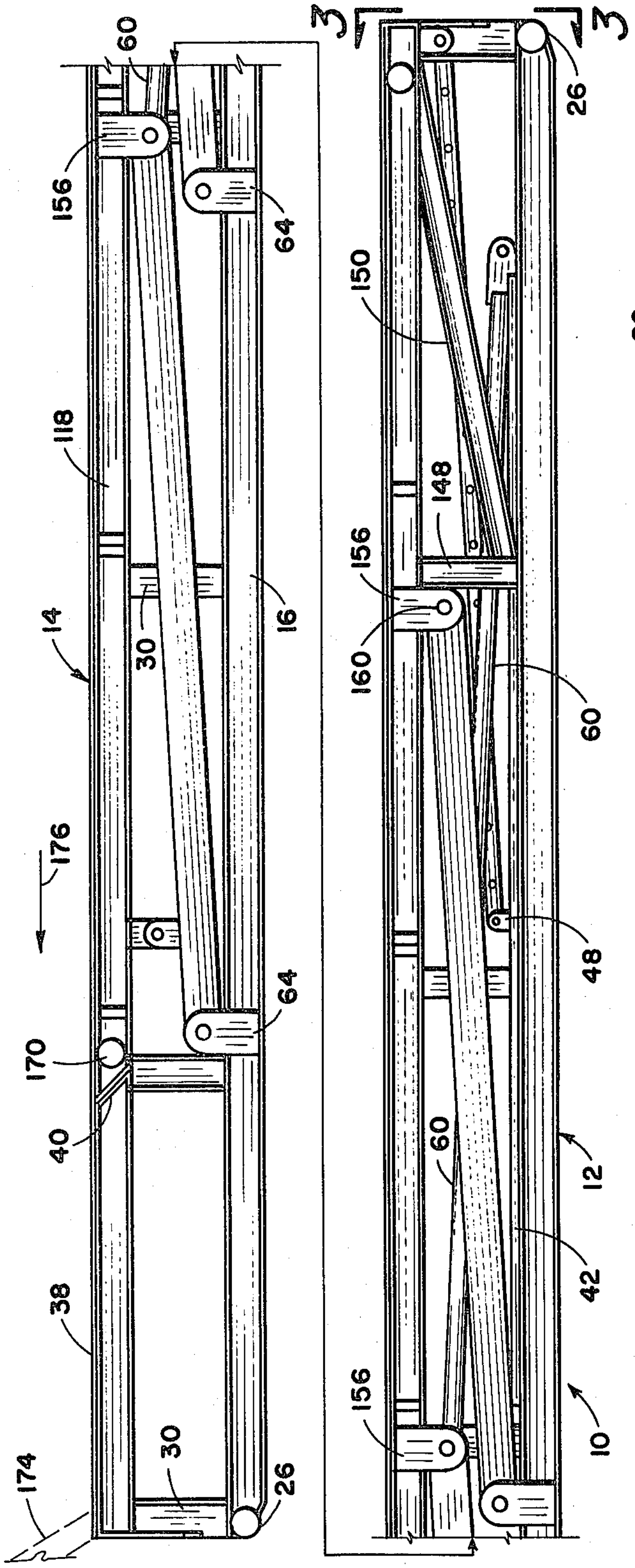
FIG. 2 is a side elevational view of an elevating catwalk apparatus embodying the invention and showing the catwalk section in a lowered position, with the apparatus being broken into two slightly overlapping longitudinal sections for purposes of illustration.
Figure 3:
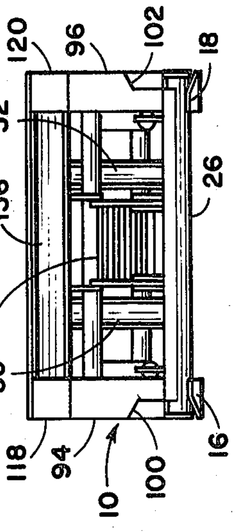
FIG. 3 is a view taken on line 3—3 of FIG. 2.

In operation, the apparatus 10 may be moved across the surface of the ground in the usual manner of a skid when the apparatus 10 is in the lowered or collapsed position thereof as shown in FIGS. 2 and 3. It is preferable to engage the opposite ends of the pipes 26 and/or 126 and 170 by suitable towing cables, or the like, for facilitating sliding of the skid beams 16 and 18 over the ground. The apparatus 10 is normally utilized in combination with the usual well drilling mast (not shown) and then the apparatus is required, the unit may be "skidded" into a position with the upright post means 30 in engagement with a leg or other suitable portion of the mast substructure, such as against the lower portion of the well known door ramp 174 (shown in broken lines in FIG. 1). This precludes any further movement of the apparatus 10 in the left hand direction as viewed in FIG. 1. Suitable hoisting equipment may then be utilized for elevating the catwalk section 14 with respect to the base means 12.

The hoisting cables may be secured to the opposite ends of the pipe 170, and a force may be exerted in the direction indicated by the arrow 176 in FIG. 2. This force causes the posts 70 and 76 to pivot about the pivot points 69 in a counter clockwise direction as viewed in FIG. 2 for elevating the catwalk structure 14 with respect to the base means 12. The forward movement of the section 12 is limited by the engagement of the leading ends of the beams 118 and 120 with the door ramp 174, as particularly shown in FIG. 1. The door ramp 174 is then preferably suitably pinned to the elevated catwalk apparatus 10 at both the top and bottom thereof.

As the posts 70 and 76 are pivoted toward the upright positions therefor, the outer ends of the brace members 60 and 62 slide in the respective tracks or rails 42 and 44 whereby the braces assume for angular position therefor shown in FIG. 1. The flanges 56 and 58 may then be suitably pinned to the respective flanges 48–50 and 52–54 for securing the brace members 60 and 62 in the bracing position as long as the catwalk 12 remains in the elevated position. Of course, the ladder means 86 rises to a substantially vertical position at the rearward end of the apparatus 10 during the elevating of the section 12 and provides ready access to the walkway provided by the floor plate 126. It will be apparent that it is preferable to provide suitable hand rail structures 178 and 180 along the lengths of the upper sides of the beams 118 and 120 for personnel safety during use of the elevated catwalk apparatus 10.

When the apparatus 10 is no longer required, the elevating procedure may be reversed, and the catwalk section 14 may be lowered to a position as shown in FIGS. 2 and 3. This may be accomplished by releasing the pinned connection points, and exerting a pull or force on the section 14 in a direction indicated by the arrow 182 in FIG. 1. The apertured flanges 166 and 168 may be engaged by suitable cables, if desired, and suitable blocks (not shown) may be positioned outboard of the rearward or right hand end of the base means 12, as viewed in the drawings, for limiting movement of the base means in the right hand direction. Then, the force exerted in the direction of the arrows 182 will reverse the pivotal action of the posts 70 and 76, and the section 14 will be lowered with respect to the base section 12.

In the lowered position of the catwalk section 14, the section 14 is supported by the upstanding support posts 30 of the base means 12, as particularly shown in FIGS. 2 and 3. In addition, the downwardly depending stop member 148 of the catwalk section 14 engages the base means 12 for supporting the rearward portion of the catwalk section 14 on the base means 12.

From the foregoing it will be apparent that the present invention provides a novel elevating catwalk apparatus comprising a base means having a catwalk section pivotally supported thereby. A plurality of raising link assemblies are pivotally connected between the base means and catwalk section for easily raising and lowering the catwalk structure with respect to the base means, and the entire structure may be easily skidded along the surface of the ground for moving from site to site at a drilling operation. In the elevated position of the catwalk section, the "ground level" is effectively raised to a position relative to the drilling floor at the well drilling site for facilitating the manual labor necessary during the elevating and/or lowering of the mast, and any other well drilling operations necessary at the site. In addition, extra sections of drill pipe may be stored in the collapsed position of the apparatus, thus providing additional utility and convenience for the device.

Whereas the present invention has been described in particular relation to the drawings attached hereto, it should be understood that other and further modifications, apart from those shown or suggested herein may be made within the spirit and scope of this invention.

What is claimed is:

1. An elevating catwalk apparatus comprising base means, a catwalk assembly pivotally secured to the base means and movable between an elevated position and a lowered position with respect thereto, lifting link assembly means pivotally interposed between the base means and catwalk assembly and responsive to a longitudinal force on the catwalk assembly in one direction for elevating of the catwalk assembly and a longitudinal force in an opposite direction for lowering of the catwalk assembly, and pivotal and slidable brace means interposed between the base means and at least one lifting link assembly means for securing the lifting link assembly in the elevated position of the catwalk assembly, and wherein the base means comprises a plurality of mutually parallel spaced beam members providing a skid for facilitating moving of the elevating catwalk apparatus from site to site, and including rail means secured to the inboard side of at least one of the beam members for slidably receiving at least one end of the brace means therein.

2. An elevating catwalk apparatus as set forth in claim 1 and including ladder means pivotally secured between the base means and catwalk assembly for providing access to the catwalk assembly in the elevated position thereof.

3. An elevating catwalk apparatus as set forth in claim 1 wherein apertured flange means is secured to the rail means for facilitating securing of the said end of the brace means in one slidable position within the rail means for securing the brace means in the bracing position thereof.

4. An elevating catwalk apparatus as set forth in claim 1 wherein the catwalk assembly includes downwardly depending stop means engageable with the base means in the lowered position of the catwalk assembly for supporting the catwalk assembly in a substantially horizontal spaced relation with respect to the base means in the lowered position of the catwalk assembly.

5. An elevating catwalk apparatus as set forth in claim 4 and including upwardly depending support post means provided on the base means for limiting the downward movement of the catwalks assembly and cooperation with the downwardly depending stop means for supporting the catwalk assembly in said substantially horizontal spaced relation with respect to the base means in the lowered position of the catwalk assembly.

6. An elevating catwalk apparatus as set forth in claim 1 wherein the catwalk assembly comprises a plurality of mutually parallel spaced beams supporting a floor plate to provide a walking surface for operating personnel, and the elevated position of the catwalk assembly effectively raises the ground level for the operating personnel.

* * * * *

REEXAMINATION CERTIFICATE (588th)

United States Patent [19]

[11] B1 4,365,692

Craig et al.

[45] Certificate Issued Nov. 4, 1986

[54] ELEVATING CATWALK

[75] Inventors: Gary W. Craig; Jack W. Langston, both of Tulsa, Okla.

[73] Assignee: Loffland Brothers Company, Tulsa, Okla.

Reexamination Request:
No. 90/000,539, Apr. 11, 1984

Reexamination Certificate for:
Patent No.: 4,365,692
Issued: Dec. 28, 1982
Appl. No.: 212,891
Filed: Dec. 4, 1980

[51] Int. Cl.⁴ .................... B60S 13/00
[52] U.S. Cl. .................... 187/8.72; 182/141
[58] Field of Search .................... 187/8.72, 8.71, 8.41, 187/18.47, 18, 9 R; 182/152, 141, 63, 101; 254/91, 89 R, 10 R, 10 B, 10 C, 122, 127; 108/111, 121, 129, 145; 248/421

[56] References Cited

U.S. PATENT DOCUMENTS

| | | | |
|---|---|---|---|
| 233,788 | 10/1880 | Mitchell | 182/141 |
| 494,452 | 3/1893 | Witzel | 182/63 |
| 923,454 | 6/1909 | Stearns | 187/8.72 |
| 1,275,381 | 8/1918 | Butler et al. | 187/8.72 |
| 1,901,726 | 3/1933 | Bonnet | 182/101 |
| 1,942,945 | 1/1934 | Smith | 254/91 |
| 2,466,155 | 4/1949 | Conrad | 182/101 |
| 2,566,668 | 9/1951 | Krueger | 108/121 |
| 2,574,236 | 11/1951 | Arner, Sr. | 254/91 |
| 2,576,426 | 11/1951 | Thurzo | 254/10 |
| 2,576,908 | 11/1951 | Wallace | 187/8.45 |
| 2,598,625 | 5/1952 | Wallace | 254/89 |
| 2,940,508 | 6/1960 | Bateman, Sr. et al. | 108/145 |
| 3,110,359 | 11/1963 | Soloman | 182/63 |
| 3,110,476 | 11/1963 | Farris | 254/122 |
| 3,161,259 | 12/1964 | Wilson | 182/141 |
| 3,317,004 | 5/1967 | Harrison, Jr. | 187/8.72 |
| 3,442,351 | 5/1969 | Parrish et al. | 182/141 |
| 3,485,321 | 12/1969 | Smith, Jr. | 182/131 |
| 3,529,694 | 9/1970 | Atchey | 182/141 |

FOREIGN PATENT DOCUMENTS

| | | |
|---|---|---|
| 713424 | of 0000 | France . |
| 751843 | of 0000 | France . |
| 1132779 | of 0000 | France . |
| 339240 | 1/1931 | United Kingdom . |

*Primary Examiner*—Joseph J. Rolla
*Assistant Examiner*—Kenneth Noland

[57] ABSTRACT

An elevating catwalk apparatus for use at a well bore drilling site, or the like, for effectively elevating the "ground level" with respect to the drilling floor of the well drilling apparatus and comprising a base framework structure having a catwalk secured thereto by a plurality of spaced support posts and movable between elevated and lowered positions with respect thereto, the opposite ends of the support posts being pivotally secured between the catwalk and the base framework, angularly disposed brace members having one end pivotally secured to at least one of the support posts and the opposite end pivotally and slidably secured to the base structure for strengthening the support of the catwalk in the elevated position thereof, the catwalk being responsive to longitudinal pressure in one direction for moving upwardly with respect to the base framework and pressure in an opposite direction for moving downwardly with respect to the base framework.

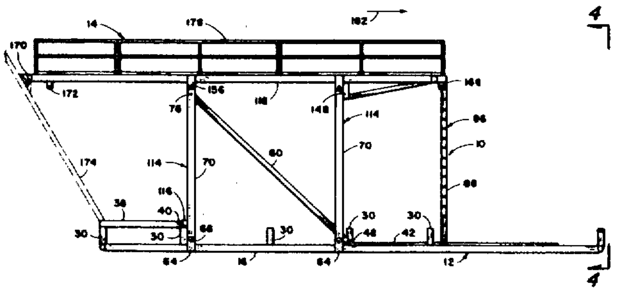

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3-6, dependent on an amended claim, are determined to be patentable.

1. An elevating catwalk apparatus comprising a longitudinal base means supported on a ground surface, a catwalk assembly pivotally secured to the base means and movable between an elevated position and a lowered catwalk position with respect thereto, lifting link assembly means *having internal bracing means* pivotally *and non-slidably* interposed between the base means and catwalk assembly and responsive to a longitudinal force on the catwalk assembly in one direction *along a force line spaced above the base means* for elevating [of] the catwalk assembly and a longitudinal force on the catwalk assembly in an opposite direction for lowering of the catwalk assembly, pivotal and slidable brace means *having one lower end slidably* secured [between] *in* the base means *independently of the lifting link assembly means* and *the opposite upper end pivotally secured to* at least one lifting link assembly for securing the lifting link assembly in the elevated position of the catwalk assembly, pin means removably engagable with the base means and brace means for securably retaining the catwalk assembly in the elevated position, and wherein the base means comprises a plurality of mutually parallel spaced beam members providing a skid for facilitating moving of the elevating catwalk apparatus from site to site, and including rail means secured to the inboard side of at least one of the beam members for slidably receiving *the* [at least] one *lower* end of the brace means therein during raising and lowering of the catwalk assembly.

2. An elevating catwalk apparatus as set forth in claim 1 and including an inboard rigid *single piece* ladder means between the beam members and pivotally secured to both ends of the ladder about [an axis] *independent spaced mutually parallel axes extending* transverse to the longitudinal axis of the apparatus, one end of the ladder pivoted to the catwalk assembly with the other end of the ladder pivoted to the base member at a point between the ends of the base member such that the ladder means is substantially vertical when the catwalk assembly is elevated[,] for providing access to the catwalk assembly in the elevated position thereof and is horizontally sandwiched between the base member and catwalk assembly in the lowered position.

* * * * *